(12) United States Patent
Park et al.

(10) Patent No.: US 11,778,612 B2
(45) Date of Patent: Oct. 3, 2023

(54) SCHEDULING USING SCHEDULING REQUEST OCCASIONS

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Juan Montojo, San Diego, CA (US); Iyab Issam Sakhnini, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 17/216,417

(22) Filed: Mar. 29, 2021

(65) Prior Publication Data

US 2021/0307040 A1  Sep. 30, 2021

Related U.S. Application Data

(60) Provisional application No. 63/002,078, filed on Mar. 30, 2020.

(51) Int. Cl.
| | | |
|---|---|---|
| *H04B 7/06* | (2006.01) | |
| *H04W 72/1273* | (2023.01) | |
| *H04W 74/02* | (2009.01) | |
| *H04W 74/08* | (2009.01) | |
| *H04W 56/00* | (2009.01) | |

(52) U.S. Cl.
CPC ..... *H04W 72/1273* (2013.01); *H04W 56/001* (2013.01); *H04W 74/02* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 10,299,275 | B2 * | 5/2019 | Hou | H04W 74/0833 |
| 10,772,119 | B2 * | 9/2020 | Zhou | H04B 7/0695 |
| 10,873,929 | B2 * | 12/2020 | Kim | H04W 72/51 |
| 10,912,124 | B2 * | 2/2021 | Zhang | H04W 72/0453 |
| 11,317,402 | B2 * | 4/2022 | Xiong | H04B 7/0695 |
| 2019/0110314 | A1 * | 4/2019 | Abedini | H04L 5/0078 |
| 2020/0036430 | A1 * | 1/2020 | Kim | H04L 25/0204 |

(Continued)

OTHER PUBLICATIONS

International Search Report and Written Opinion—PCT/US2021/024912—ISA/EPO—dated Jul. 14, 2021.

(Continued)

*Primary Examiner* — Sithu Ko
(74) *Attorney, Agent, or Firm* — Harrity & Harrity, LLP

(57) ABSTRACT

Various aspects of the present disclosure generally relate to wireless communication. In some aspects, a user equipment may receive configuration information indicating a set of scheduling request (SR) occasions (SROs), wherein the configuration information identifies a set of mappings between the set of SROs and a set of synchronization signal blocks (SSBs); receive an SSB of the set of SSBs; and transmit one or more SRs on one or more selected SROs associated with the received SSB based at least in part on the set of mappings. Numerous other aspects are provided.

30 Claims, 9 Drawing Sheets

(56) References Cited

U.S. PATENT DOCUMENTS

2020/0059878 A1* 2/2020 Huang ................. H04L 5/0091
2020/0275479 A1* 8/2020 Peisa ................. H04W 74/0833

OTHER PUBLICATIONS

Sharp: "Discussion on Mechanisms for Beam Failure Recovery", 3GPP TSG RAN WG1 Meeting #91, 3GPP Draft, R1-1720613, 3rd Generation Partnership Project (3GPP), Mobile Competence Centre, 650, Route Des Lucioles, F-06921 Sophia-Antipolis Cedex, France, vol. RAN WG1, No. Reno, Nevada, USA, Nov. 27, 2017-Dec. 1, 2017, 6 Pages, Nov. 18, 2017 (Nov. 18, 2017), XP051370079, Retrieved from the Internet: URL: http://www.3gpp.org/ftp/tsg%5Fran/WG1%5FRL1/TSGR1%5F91/Docs/ [retrieved on Nov. 18, 2017] sections 2 to 2.5.

* cited by examiner

SCHEDULING USING SCHEDULING REQUEST OCCASIONS

CROSS-REFERENCE TO RELATED APPLICATION

This Patent application claims priority to U.S. Provisional Patent Application No. 63/002,078, filed on Mar. 30, 2020, entitled "SCHEDULING USING SCHEDULING REQUEST OCCASIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for scheduling using scheduling request (SR) occasions (SROs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include receiving configuration information indicating a set of scheduling request (SR) occasions (SROs), wherein the configuration information identifies a set of mappings between the set of SROs and a set of synchronization signal blocks (SSBs); receiving an SSB of the set of SSBs; and transmitting one or more SRs on one or more selected SROs associated with the received SSB based at least in part on the set of mappings.

In some aspects, a method of wireless communication, performed by a base station, may include transmitting configuration information indicating a set of SROs, wherein the configuration information identifies a set of mappings between the set of SROs and a set of SSBs; transmitting the set of SSBs; and receiving one or more SRs on one or more selected SROs associated with an SSB, of the set of SSBs, based at least in part on the set of mappings.

In some aspects, a UE for wireless communication may include a memory and one or more processors operatively coupled to the memory. The memory and the one or more processors may be configured to receive configuration information indicating a set of SROs, wherein the configuration information identifies a set of mappings between the set of SROs and a set of SSBs; receive an SSB of the set of SSBs; and transmit one or more SRs on one or more selected SROs associated with the received SSB based at least in part on the set of mappings.

In some aspects, a base station for wireless communication may include a memory and one or more processors operatively coupled to the memory. The memory and the one or more processors may be configured to transmit configuration information indicating a set of SROs, wherein the configuration information identifies a set of mappings between the set of SROs and a set of SSBs; transmit the set of SSBs; and receive one or more SRs on one or more selected SROs associated with an SSB, of the set of SSBs, based at least in part on the set of mappings.

In some aspects, a non-transitory computer-readable medium may store one or more instructions for wireless communication. The one or more instructions, when executed by one or more processors of a UE, may cause the one or more processors to receive configuration information indicating a set of SROs, wherein the configuration information identifies a set of mappings between the set of SROs and a set of SSBs; receive an SSB of the set of SSBs; and transmit one or more SRs on one or more selected SROs associated with the received SSB based at least in part on the set of mappings.

In some aspects, a non-transitory computer-readable medium may store one or more instructions for wireless communication. The one or more instructions, when executed by one or more processors of a base station, may cause the one or more processors to transmit configuration information indicating a set of SROs, wherein the configuration information identifies a set of mappings between the set of SROs and a set of SSBs; transmit the set of SSBs; and receive one or more SRs on one or more selected SROs associated with an SSB, of the set of SSBs, based at least in part on the set of mappings.

In some aspects, an apparatus for wireless communication may include means for receiving configuration information indicating a set of SROs, wherein the configuration information identifies a set of mappings between the set of SROs and a set of SSBs; means for receiving an SSB of the set of SSBs; and means for transmitting one or more SRs on one or more selected SROs associated with the received SSB based at least in part on the set of mappings.

In some aspects, an apparatus for wireless communication may include means for transmitting configuration information indicating a set of SROs, wherein the configuration information identifies a set of mappings between the set of SROs and a set of SSBs; means for transmitting the set of SSBs; and means for receiving one or more SRs on one or more selected SROs associated with an SSB, of the set of SSBs, based at least in part on the set of mappings.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
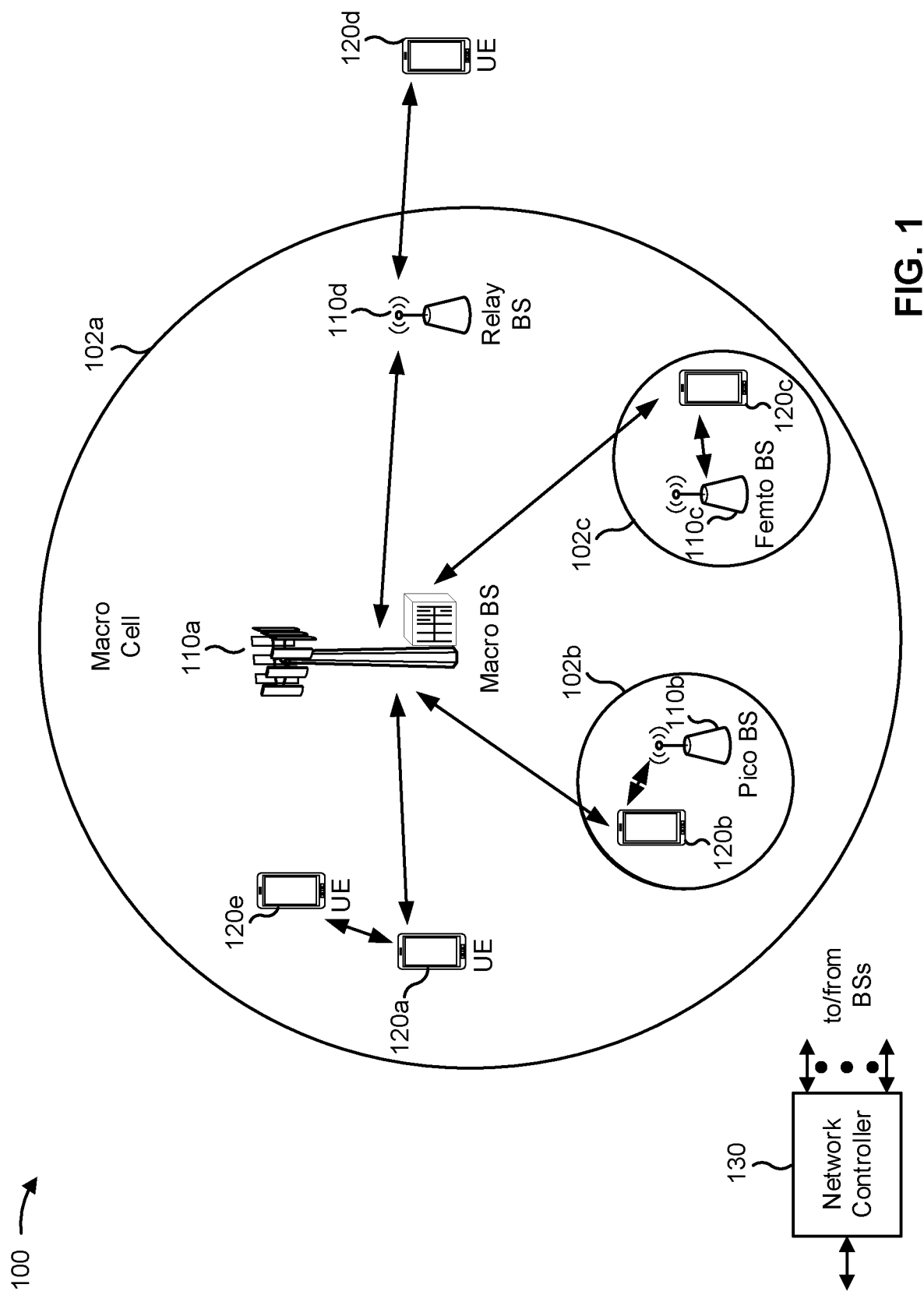
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
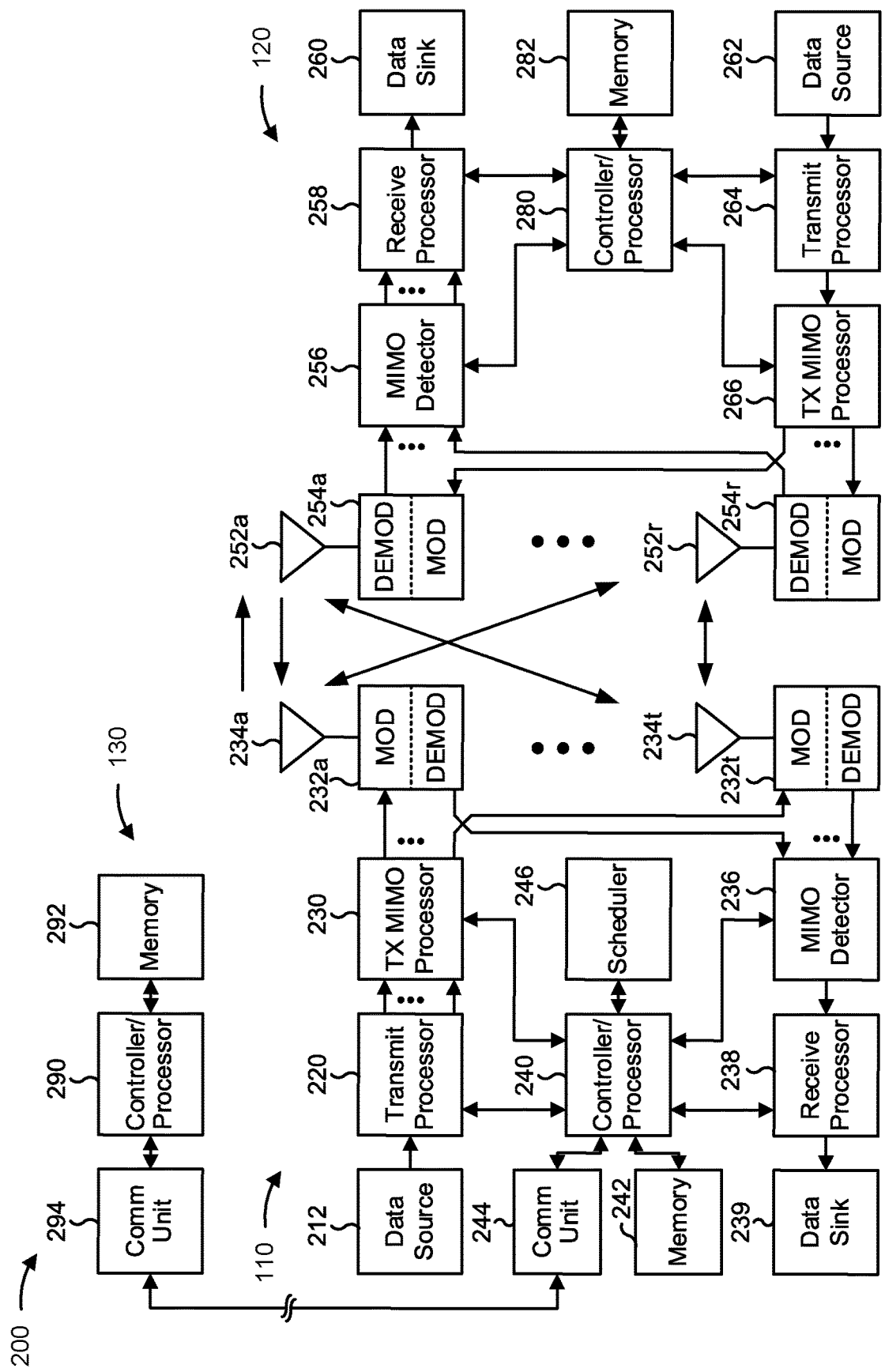
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-9).

Controller/processor 240 of base station 110, controller/processor 280 of UE 120, and/or any other component(s) of FIG. 2 may perform one or more techniques associated with, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for receiving configuration information indicating a set of SROs, wherein the configuration information identifies a set of mappings between the set of SROs and a set of synchronization signal blocks (SSBs); means for receiving an SSB of the set of SSBs; means for transmitting one or more SRs on one or more selected SROs associated with the received SSB based at least in part on the set of mappings; means for selecting the one or more selected SROs associated with the received SSB based at least in part on receiving the SSB; means for determining a transmit beam associated with the received SSB; means for receiving, on one or more receive beams associated with the one or more selected SROs, at least one of a control channel or a downlink transmission associated with the control channel; means for monitoring for the control channel during a time period after transmitting the one or more SRs; means for transmitting another SR after the time period has elapsed based at least in part on failing to receive the control channel during the time period; means for monitoring a control channel occasion that is mapped to the one or more selected SROs based at least in part on the one or more SRs being transmitted on the one or more selected SROs; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting configuration information indicating a set of SROs, wherein the configuration information identifies a set of mappings between the set of SROs and a set of SSBs; means for transmitting the set of SSBs; means for receiving one or more SRs on one or more selected SROs associated with an SSB, of the set of SSBs, based at least in part on the set of mappings; means for monitoring the set of SROs using respective beams corresponding to the set of SSBs, wherein the receiving is based at least in part on the monitoring; means for transmitting, on one or more transmit beams associated with the one or more selected SROs, at least one of a control channel or a downlink transmission associated with the control channel; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Some UEs may be associated with a reduced capability relative to a baseline UE (e.g., an enhanced mobile broadband (eMBB) UE and/or the like). For example, a reduced capability (RedCap) UE, an Internet of Things (IoT) UE, a machine-type communication (MTC) UE, an NR Light UE, and/or the like may be associated with a reduced capability relative to an eMBB UE. The reduced capability may relate to a data rate, a latency, an availability or reliability threshold, a battery lifetime, a device size, or the like. A reduced-capability UE may be used for an industrial wireless sensor, a video surveillance device, a smart wearable device, and/or the like. In some aspects, a reduced-capability UE may be characterized by an uplink-heavy traffic profile, sparse and/or aperiodic traffic (such as for a motion-detection-based surveillance camera), a small-sized payload burst, and/or the like.

Due to the aperiodic and unpredictable uplink traffic associated with such UEs, assigning a dedicated configured grant (CG) resource (such as using semi-static scheduling) may not be resource-efficient. Therefore, a scheduling request (SR) based uplink resource allocation scheme may be used. For example, a UE may transmit an SR when data is to be transmitted by the UE, and may receive a dynamic uplink grant from a scheduling entity, such as a BS. The UE may stay in a connected mode (e.g., a radio resource control (RRC) connected mode and/or the like) to maintain uplink transmission resources (e.g., a physical uplink control channel (PUCCH), a physical uplink shared channel (PUSCH), a sounding reference signal (SRS) configuration, and/or the like). For example, frequent transitioning between connected mode and idle or inactive may be more power consuming for the UE. In this case, the UE may operate in a discontinuous reception (DRX) mode with a long cycle (for downlink control channel monitoring power saving) or a sleep mode operation. Furthermore, for stationary applications (e.g., associated with low or no device mobility) and small payload (low data rate), link measurement and adaptation may not be particularly beneficial, since channel conditions of the UE are not likely to change at a sub-second or millisecond granularity. Thus, active closed-loop link adaptation (e.g., using a periodic or semi-persistent channel state information reference signal or an SRS) may use significant resources of the UE for limited benefit. For example, frequent beam management may not be power-efficient for reduced-capability UEs. However, if beam management is performed infrequently, then the UE and the BS may not know a best beam for a PUCCH transmission of the UE, which may reduce efficiency of the PUCCH transmission.

Techniques and apparatuses described herein may provide an event-triggered beam determination for an SR without performing frequent (e.g., periodic or semi-persistent channel state information reference signal (CSI-RS) or SRS-based) beam management procedures. For example, some techniques and apparatuses described herein provide for multiple SROs to be configured for a UE. Each SRO may be associated with one or more synchronization signal blocks (SSBs). For example, a mapping of SROs to SSBs may be one-to-one, many-to-one, one-to-many, or many-to-many. The UE may select an SRO based at least in part on receiving an SSB associated with the SRO, and may transmit an SR on the selected SRO. In some aspects, a UE-specific SR resource may be used for the SR, for example, when an SRO is shared by multiple UEs. A base station may identify one or more beams for physical downlink control channel (PDCCH) and/or physical downlink shared channel (PDSCH) transmission to the UE based at least in part on the SSB associated with the SRO. For example, the one or more beams may correspond to one or more beams used to transmit the SSB. Some techniques and apparatuses described herein provide for an SRO to be mapped to one or more PDCCH occasions, so that a monitoring burden for the UE is reduced relative to the UE having to monitor a full range of potential PDCCH occasions.

In this way, identification of a beam for a UE-triggered PDCCH and/or PDSCH is provided. Thus, computing and communication resources that would otherwise be used to perform beam management on an ongoing basis may be conserved. Furthermore, power usage of the UE may be reduced relative to performing ongoing beam management.

Figure 3:
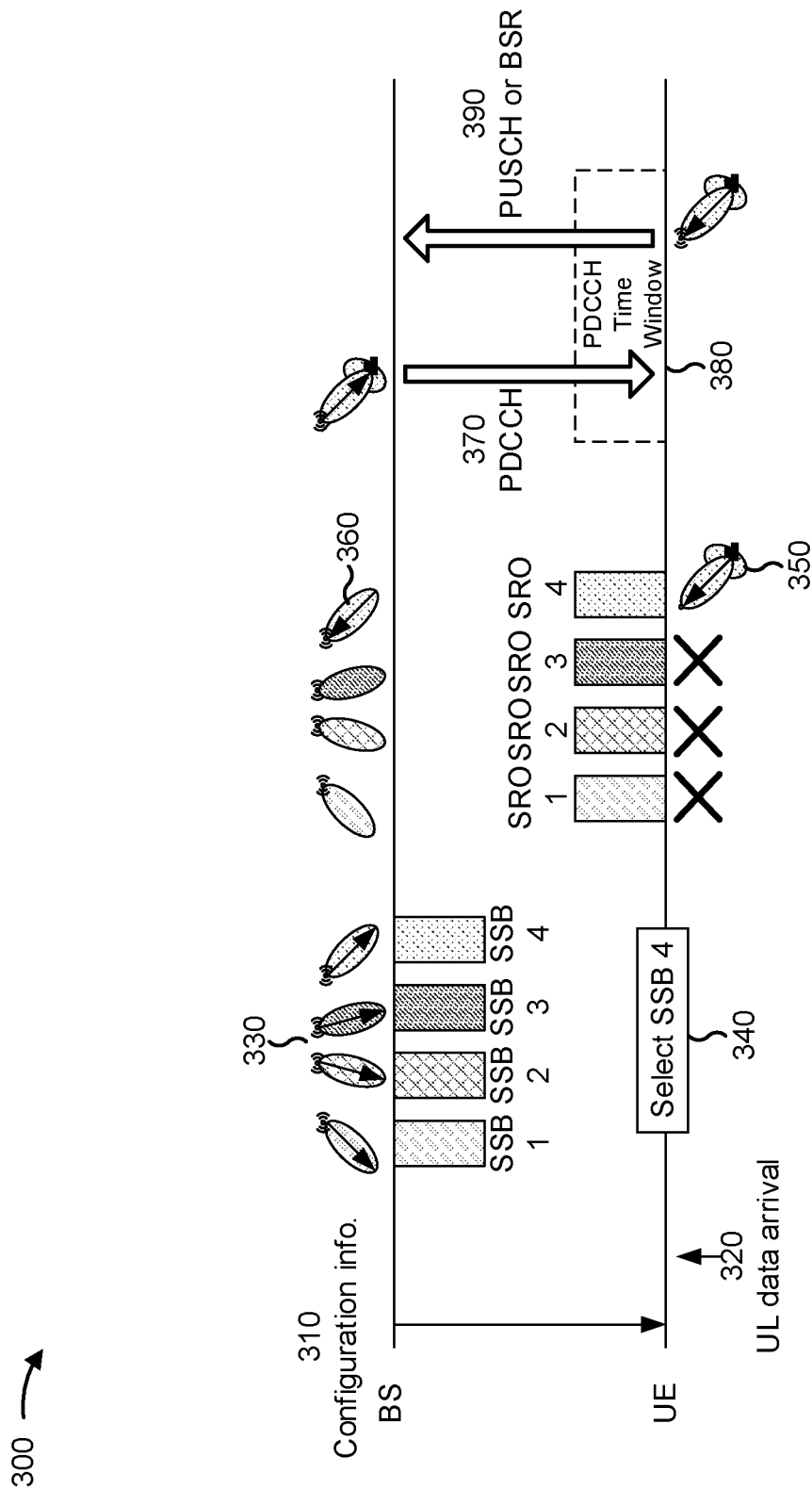
FIGS. 3-7 are diagrams illustrating examples of scheduling using SROs, in accordance with the present disclosure.

FIG. 3 is a diagram illustrating an example 300 of scheduling using SROs, in accordance with the present disclosure. Examples 300 of FIG. 3, 400 of FIG. 4, 500 of FIG. 5, 600 of FIG. 6, and 700 of FIG. 7 involve communications by a UE (e.g., UE 120) and a base station (e.g., BS 110). In some aspects, the UE may be a reduced-capability UE, such as a RedCap UE, an NR Light UE, an IoT UE, an MTC UE, and/or the like. The UE may be in a connected mode, an idle mode, an inactive mode, or the like.

As shown by reference number 310, the base station may provide configuration information to the UE. The configuration information may identify a configuration associated with a set of SROs. For example, the configuration information may identify a set of mappings between the set of SROs and a set of SSBs to be transmitted by the base station. An SRO may identify a resource allocation (e.g., a time resource, a frequency resource, a transmit beam configuration, and/or the like) to be used by the UE to transmit an SR.

An SR is a message requesting that a base station schedule a resource allocation for a transmission by the UE, such as a small data transmission.

The UE may select an SRO based at least in part on an SSB associated with the SRO. An SSB is a set of reference signals and channels including a primary synchronization signal, a secondary synchronization signal, and a physical broadcast channel. SSBs are sometimes referred to as SS blocks. Generally, SSBs are transmitted by a base station in a time domain pattern using different transmit beams (e.g., using different spatial transmission parameters). A UE may monitor for SSBs using various receive beams, and may identify a "best SSB," which is an SSB with a best measurement value or an SSB with a measurement value that satisfies a threshold. In some aspects, the UE may report the best SSB (such as an SSB index) back to the base station for beam selection or refinement.

In some aspects, multiple SROs may be configured. An SRO may be associated with one or more SSBs. For example, SROs may be associated with (e.g., mapped to) SSBs on a one-to-one basis (e.g., a single SRO may be mapped to a single SSB). As another example, an SRO may be associated with multiple SSBs. In this case, the UE 120 may select the SRO when any SSB, of the multiple SSBs, is selected as a best SSB. As yet another example, multiple SROs may be associated with a single SSB. In this case, the UE 120 may select the multiple SROs when the SSB is selected as a best SSB, and may transmit SRs on each of the multiple SROs.

In some aspects, an SRO may be UE-specific. For example, the SRO configured for a UE may be unique to the UE, or may not be configured for other UEs covered by the base station. In some aspects, an SRO may be cell-specific. In some aspects, the SRO may be associated with a random access channel (RACH) occasion. For example, the RACH occasion may be for SRO signaling (e.g., may be UE-specific). As another example, the RACH occasion may be shared for non-SRO-related signaling and SRO-related signaling.

In some aspects, if the configured SROs are RACH occasions and/or the like, multiple UEs may share an SRO. For example, multiple UEs may share an SRO for a cell-specific configured SRO. In this case, the configuration information may assign respective UE-specific SR resources to the multiple UEs. For example, if RACH occasions are used for the SROs, respective contention-free RACH preambles may be assigned to the UE for the RACH occasions. In some aspects, the UE may be configured with a respective contention-free RACH preamble at each RACH occasion configured for the UE. In some aspects, the UE may be configured with one or more contention-free RACH preambles for a subset (e.g., a proper subset) of RACH occasions.

In some aspects, the configuration information may identify a PDCCH occasion associated with an SRO. For example, the configuration information may identify a mapping of one or more PDCCH occasions to one or more SROs. A PDCCH occasion is a set of resources in which a PDCCH directed to a UE may be transmitted. The UE may monitor for a PDCCH on a PDCCH occasion associated with the SRO on which the UE transmitted an SR, thereby conserving monitoring resources that would otherwise be used to monitor a wider range of PDCCH occasions and reducing power consumption. In some aspects, a single PDCCH occasion may be mapped to a single SRO. In some aspects, a single PDCCH occasion may be mapped to multiple SROs. In some aspects, multiple PDCCH occasions may be mapped to a single PDCCH occasion. In some aspects, if the UE is not configured with a mapping between PDCCH occasions and SROs, the UE may monitor for the PDCCH during a time duration after the SR is transmitted. In this case, if the UE does not receive a PDCCH containing an uplink grant for the UE, the UE may retransmit the SR (or may transmit another SR) on a subsequent SRO (e.g., a next SRO).

As shown by reference number 320, an uplink data transmission may arrive at the UE. For example, the UE may determine that the uplink data transmission is to be transmitted to the base station. In some aspects, the uplink data transmission may be aperiodic. For example, the uplink data transmission may not be associated with a configured grant. Furthermore, in some aspects, the UE may not perform beam management on an ongoing basis. Techniques and apparatuses described herein provide for the UE to identify an SRO on which to transmit an SR for the uplink data transmission, and for the base station to identify a beam for a PDCCH associated with the uplink data transmission based at least in part on the SRO.

As shown by reference number 330, the BS may broadcast SSBs, one or more of which may be received by the UE. For example, the BS may transmit the SSBs using beam sweeping across multiple transmit beams. As shown by reference number 340, the UE may identify a best SSB of the SSBs transmitted by the BS. For example, the UE may identify the best SSB based at least in part on respective measurements of the SSBs (e.g., respective signal to interference plus noise ratio (SINR) values, respective reference signal received power (RSRP) values, respective reference signal received quality (RSRQ) values, and/or the like). In this example, the UE selects SSB 4.

As shown by reference number 350, the UE may transmit an SR on SRO 4, which corresponds to SSB 4. For example, the UE may transmit the SR using a transmit beam corresponding to a receive beam used by the UE to receive SSB 4. In this example, SRO 4 is a UE-specific SRO for the UE, and SRO 4 is mapped to a single SSB (e.g., SSB 4). As shown by reference number 360, the BS may detect the SR on SRO 4. For example, the BS may monitor SROs 1, 2, 3, and 4 using respective receive beams corresponding to transmit beams used to transmit SSBs 1, 2, 3, and 4.

As shown by reference number 370, the BS may transmit a PDCCH on a transmit beam corresponding to SSB 4 and/or SRO 4. For example, the PDCCH may include downlink control information (DCI) for an uplink grant for the uplink data transmission to be performed by the UE. As shown by reference number 380, the UE may receive the PDCCH based at least in part on monitoring in a time window. For example, the UE may monitor for the PDCCH in the time window after transmitting the SRO based at least in part on the UE not being configured with a mapping identifying a PDCCH occasion associated with the SRO. As shown by reference number 390, the UE may transmit the uplink data transmission or a buffer status report (BSR) message using the beam associated with the SRO and the SSB.

As indicated above, FIG. 3 is provided as an example. Other examples may differ from what is described with respect to FIG. 3.

Figure 4:
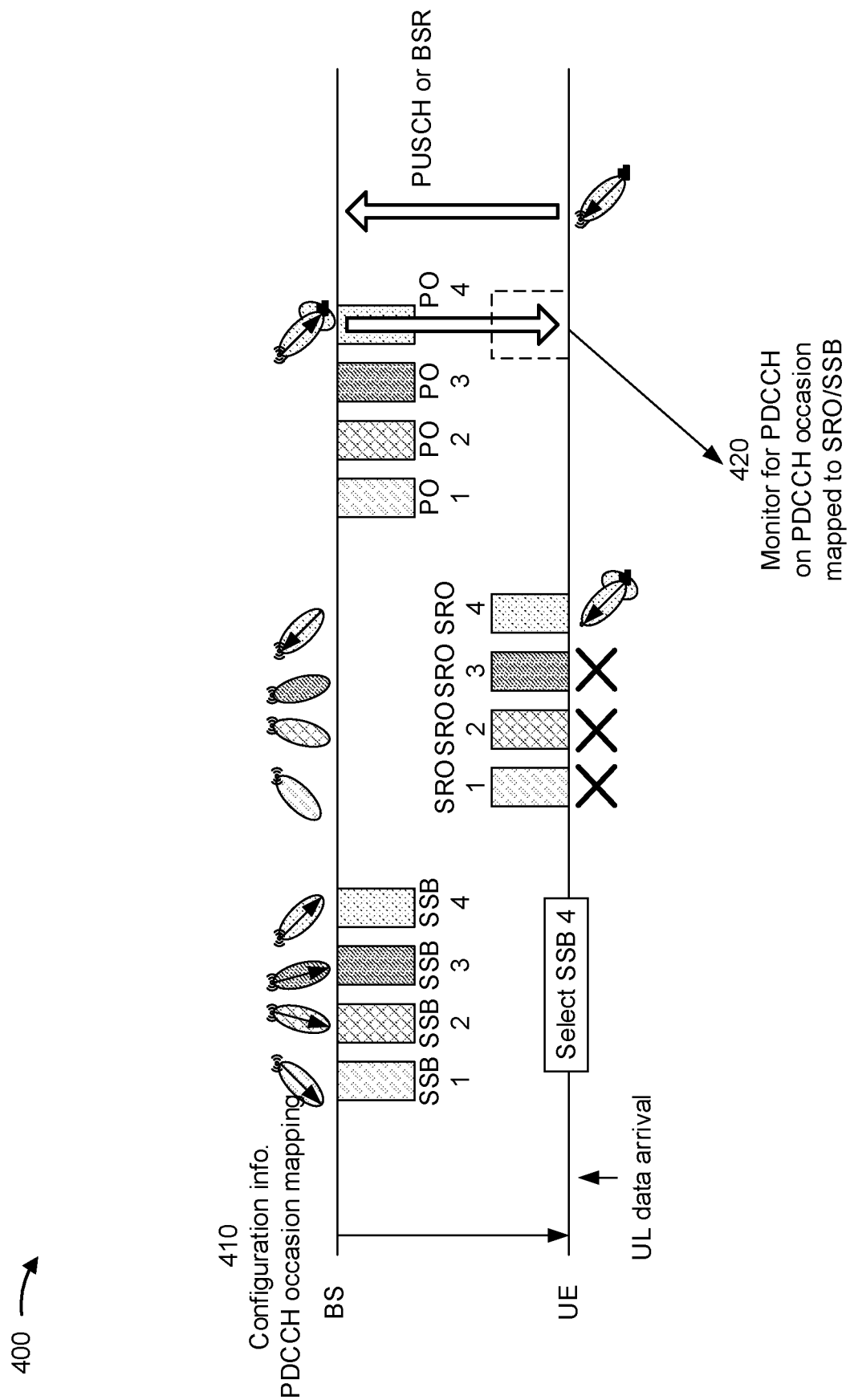

FIG. 4 is a diagram illustrating an example 400 of scheduling using SROs based at least in part on a PDCCH occasion mapping, in accordance with the present disclosure. In example 400, the configuration information shown by reference number 410 identifies a mapping associated with a PDCCH occasion. For example, the configuration information may identify a mapping between SROs and/or SSBs and corresponding PDCCH occasions. This configuration is described in more detail in connection with reference number 310 of FIG. 3.

Many of the operations shown in FIG. 4 are similar to those shown in FIG. 3, and are not described any further. As shown, the UE selects SRO 4 based at least in part on selecting SSB 4, and transmits an SR on SRO 4. As shown by reference number 420, the UE may monitor PDCCH occasion (PO) 4 based at least in part on the configuration information indicating that PO 4 is mapped to SRO 4 and/or SSB 4. Thus, the UE 120 may reduce power consumption and usage of monitoring resources by monitoring only PO 4, rather than monitoring a time window including POs 1, 2, 3, and 4.

As indicated above, FIG. 4 is provided as an example. Other examples may differ from what is described with respect to FIG. 4.

Figure 5:
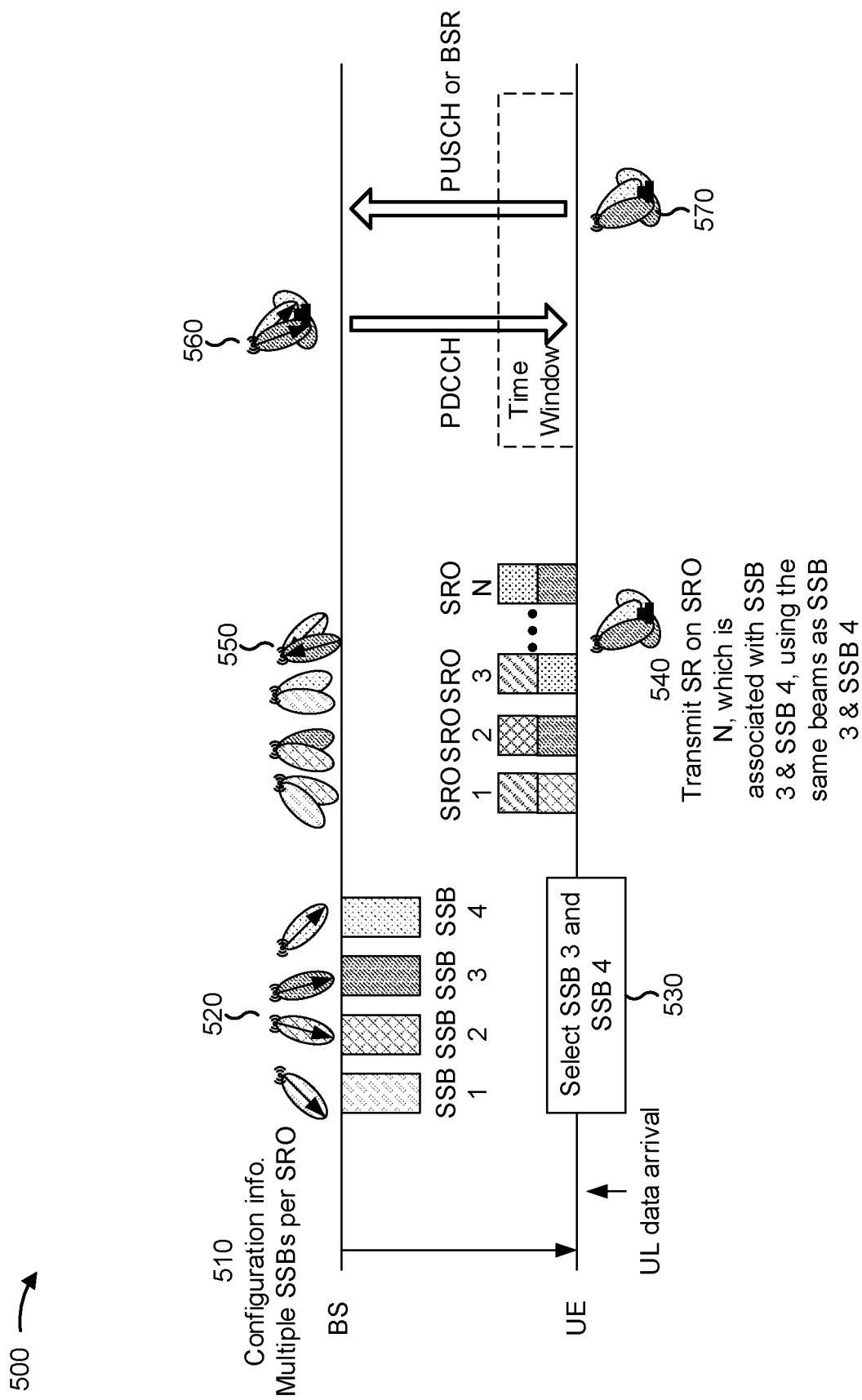

FIG. 5 is a diagram illustrating an example 500 of scheduling using SROs, in accordance with the present disclosure. In example 500, one SRO is mapped to multiple SSBs. This may be useful, for example, for UEs that operate using multiple beams (e.g., the multi-beam operation case). As shown, the configuration information, shown by reference number 510, may identify multiple SSBs per SRO. The base station may transmit SSBs on respective beams, as shown by reference number 520. The UE may select multiple SSBs, for example, using two or more receive beams of the UE. Here, as shown by reference number 530, the UE selects SSB 3 and SSB 4. Thus, as shown by reference number 540, the UE may transmit SRs on an SRO N, which is mapped to the combination of SSB 3 and SSB 4. For example, different SROs may be mapped to different sets of SSBs, as indicated by the pairs of fill shown for each SRO. SRO N may identify respective resources and/or beams associated with SSB 3 and SSB 4, and these respective resources and/or beams may be used to transmit the respective SRs associated with SSB 3 and SSB 4. As shown by reference number 550, the BS may detect the SRs on SRO N based at least in part on monitoring receive beams associated with SSB 3 and SSB 4 for the respective SRs. Thus, as shown by reference number 560, the BS may transmit a PDCCH including a DCI for an uplink grant using the multiple beams associated with SSB 3 and SSB 4. As shown by reference number 570, the UE may transmit a PUSCH or a BSR using the multiple beams associated with SSB 3 and SSB 4 and/or SRO N.

Example 500 shows an example wherein there are more SROs than SSBs. For example, there are 4 SSBs in example 500, and SROs 1 through N are mapped to different combinations of 2 of the 4 SSBs, meaning that there can be up to 6 SROs. This may be useful for multi-beam operation. In some cases, there may be more SSBs than SROs. For example, there may be only two SROs. In this example, SRO1 may be associated with SSB 1 and SSB 2, and SRO2 may be associated with SSB 3 and SSB 4. This may reduce SRO overhead at the cost of reduced flexibility in SRO selection. For example, if the best beams were associated with SSB 1 and SSB 3, the UE may have no way of signaling this selection.

In some aspects, a first set of SROs may be mapped to single SSBs, and a second set of SROs may be mapped to multiple SSBs. For example, one or more SROs of the first group may be associated with respective single SSBs, as described in connection with FIG. 3. One or more SROs of the second group may be associated with respective sets of multiple SSBs, as described in connection with FIG. 5. This may provide flexibility for single-beam selection and multi-beam selection using a same configuration.

As indicated above, FIG. 5 is provided as an example. Other examples may differ from what is described with respect to FIG. 5.

Figure 6:
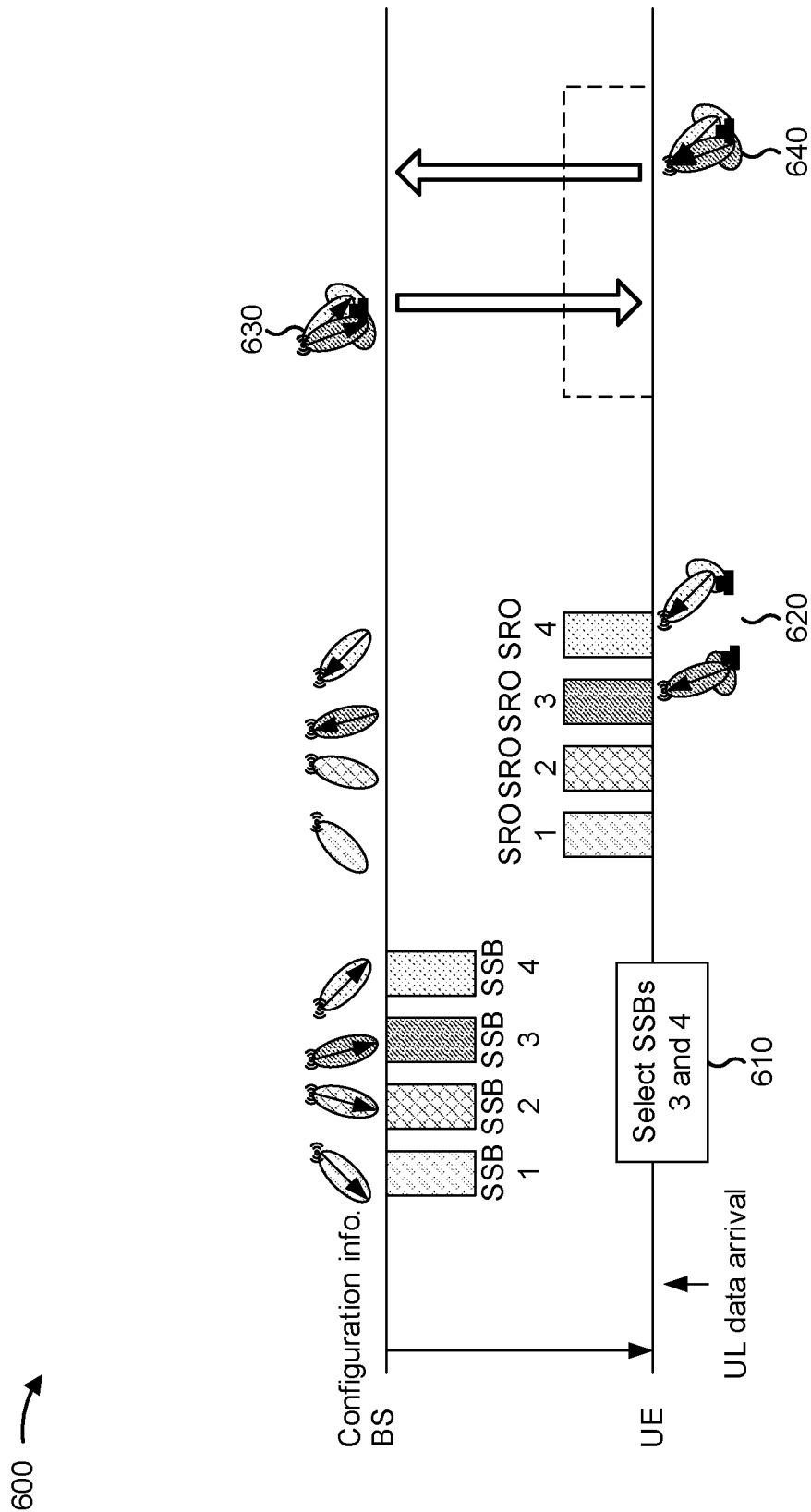

FIG. 6 is a diagram illustrating an example 600 of scheduling using SROs, in accordance with the present disclosure. In example 600, SROs and SSBs are configured with a one-to-one mapping, and the UE selects multiple SSBs. For example, as shown by reference number 610, the UE may select SSB 3 and SSB 4. Accordingly, as shown by reference number 620, the UE may transmit (and the base station may receive) respective SRs on SRO3 and SRO4. As shown by reference number 630, the base station may transmit the PDCCH using beams corresponding to SRO3 and SRO4. As shown by reference number 640, the UE may transmit the PUSCH or the BSR using the beams corresponding to SRO3 and SRO4. Thus, the UE may select multiple beams for transmission of a PDCCH, a PDSCH, a PUSCH, and/or a BSR in a one-to-one mapping configuration.

As indicated above, FIG. 6 is provided as an example. Other examples may differ from what is described with respect to FIG. 6.

Figure 7:
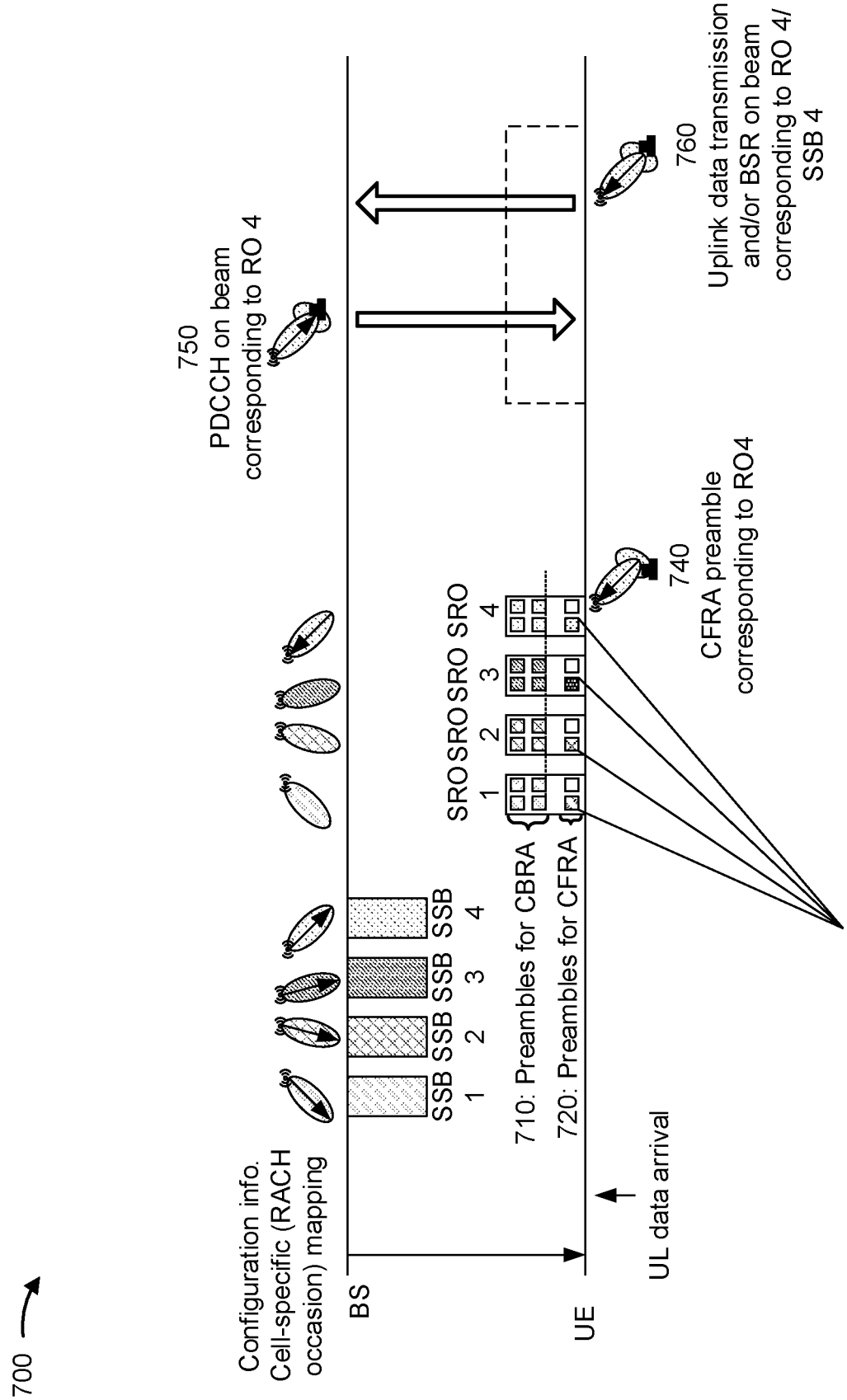

FIG. 7 is a diagram illustrating an example 700 of scheduling using SROs, in accordance with the present disclosure. Example 700 shows an example of a cell-specific SRO configuration using RACH occasions. The RACH occasions are shown by reference numbers 710 and 720. Reference number 710 shows contention-based RACH occasions, which may use contention-based random access (CBRA) preambles, and reference number 720 shows contention-free RACH occasions, which may use contention-free random access (CFRA) preambles. As shown by the respective fills of the RACH occasions, each set of RACH occasions may be associated with a respective SSB. Thus, the sets of RACH occasions may be configured as SROs. The UE may transmit a RACH preamble on a RACH occasion configured as associated with a selected SSB.

As shown by reference number 730, some of the contention-free RACH occasions may be configured for (e.g., dedicated to) the UE. For example, the UE may be configured with a respective contention-free RACH occasion for each SSB. Thus, the contention-free RACH occasions may be used as UE-specific SROs, whereas the contention-based RACH occasions may be used as cell-specific SROs.

As shown by reference number 740, the UE may transmit a CFRA preamble on RO4 corresponding to SSB 4. As shown by reference number 750, the base station may transmit a PDCCH, including DCI for an uplink grant, on a beam corresponding to RO4. This may be similar to RACH Message 2 in a CFRA procedure. As shown by reference number 760, the UE may transmit an uplink data transmission and/or a BSR on a beam corresponding to SSB 4 and/or RO4. This may be similar to RACH Message 3 in a CFRA procedure.

As indicated above, FIG. 7 is provided as an example. Other examples may differ from what is described with respect to FIG. 7.

Figure 8:
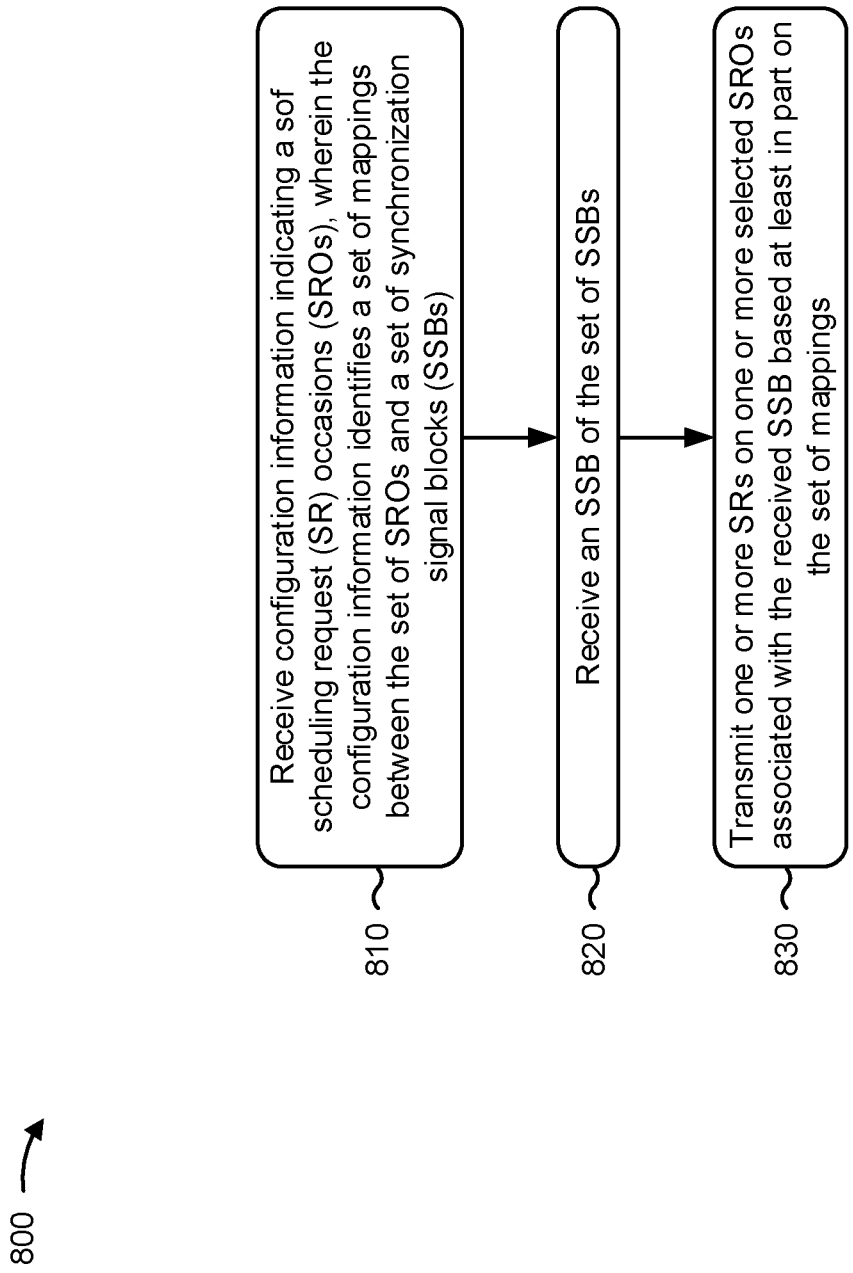
FIG. 8 is a diagram illustrating an example process performed, for example, by a user equipment, in accordance with the present disclosure.

FIG. 8 is a diagram illustrating an example process 800 performed, for example, by a UE, in accordance with the present disclosure. Example process 800 is an example where the UE (e.g., UE 120, the UE of FIGS. 3-7, and/or the like) performs operations associated with scheduling using SROs.

As shown in FIG. 8, in some aspects, process 800 may include receiving configuration information indicating a set of SROs, wherein the configuration information identifies a set of mappings between the set of SROs and a set of SSBs (block 810). For example, the UE (e.g., using antenna 252, DEMOD 254, MIMO detector 256, receive processor 258, controller/processor 280, and/or the like) may receive configuration information indicating a set of SROs, as described above. In some aspects, the configuration information identifies a set of mappings between the set of SROs and a set of SSBs.

As further shown in FIG. 8, in some aspects, process 800 may include receiving an SSB of the set of SSBs (block 820). For example, the (e.g., using antenna 252, DEMOD 254, MIMO detector 256, receive processor 258, controller/processor 280, and/or the like) may receive an SSB of the set of SSBs, as described above. In some aspects, the UE may receive multiple SSBs of the set of SSBs, as described elsewhere herein.

As further shown in FIG. 8, in some aspects, process 800 may include transmitting one or more SRs on one or more selected SROs associated with the received SSB based at least in part on the set of mappings (block 830). For example, the UE (e.g., using controller/processor 280, transmit processor 264, TX MIMO processor 266, MOD 254, antenna 252, and/or the like) may transmit one or more SRs on one or more selected SROs associated with the received SSB based at least in part on the set of mappings, as described above.

Process 800 may include additional aspects, such as any single aspect or any combination of aspects described below and/or in connection with one or more other processes described elsewhere herein.

In a first aspect, the set of SROs is UE-specific.

In a second aspect, alone or in combination with the first aspect, the set of SROs is cell-specific.

In a third aspect, alone or in combination with one or more of the first and second aspects, the set of SROs comprises a set of random access channel occasions.

In a fourth aspect, alone or in combination with one or more of the first through third aspects, the set of mappings includes mappings of single SROs, of the set of SROs, to single SSBs of the set of SSBs.

In a fifth aspect, alone or in combination with one or more of the first through fourth aspects, the set of mappings includes a mapping of a single SRO, of the set of SROs, to two or more SSBs of the set of SSBs.

In a sixth aspect, alone or in combination with one or more of the first through fifth aspects, the set of mappings includes a mapping of two or more SROs, of the set of SROs, to a single SSB of the set of SSBs.

In a seventh aspect, alone or in combination with one or more of the first through sixth aspects, process 800 includes selecting the one or more selected SROs associated with the received SSB based at least in part on receiving the SSB, wherein transmitting the one or more SRs on the one or more selected SROs is based at least in part on selecting the one or more selected SROs.

In an eighth aspect, alone or in combination with one or more of the first through seventh aspects, the SSB is associated with a best measurement of a received set of SSBs that are received by the UE.

In a ninth aspect, alone or in combination with one or more of the first through eighth aspects, process 800 includes determining a transmit beam associated with the received SSB, wherein the transmitting comprises transmitting the one or more SRs on the one or more selected SROs using the transmit beam.

In a tenth aspect, alone or in combination with one or more of the first through ninth aspects, the one or more selected SROs comprise one or more cell-specific SROs, and the one or more SRs are transmitted on a UE-specific SR resource, identified by the configuration information, associated with the UE.

In an eleventh aspect, alone or in combination with one or more of the first through tenth aspects, the UE-specific SR resource includes a contention-free random access channel preamble.

In a twelfth aspect, alone or in combination with one or more of the first through eleventh aspects, the one or more cell-specific SROs comprise one or more RACH occasions, and the UE is configured with one or more respective contention-free RACH preambles corresponding to the one or more RACH occasions.

In a thirteenth aspect, alone or in combination with one or more of the first through twelfth aspects, the one or more cell-specific SROs comprise multiple RACH occasions, and the UE is configured with one or more respective contention-free RACH preambles corresponding to a subset of the one or more RACH occasions.

In a fourteenth aspect, alone or in combination with one or more of the first through thirteenth aspects, process 800 includes receiving, on one or more receive beams associated with the one or more selected SROs, at least one of a control channel or a downlink transmission associated with the control channel.

In a fifteenth aspect, alone or in combination with one or more of the first through fourteenth aspects, based at least in part on the one or more selected SROs being mapped to a single SSB and the one or more SRs being transmitted using a single SRO, the one or more receive beams include a single receive beam.

In a sixteenth aspect, alone or in combination with one or more of the first through fifteenth aspects, based at least in part on the one or more selected SROs being mapped to a single SSB and the one or more SRs including multiple SRs that are transmitted on multiple SROs, the one or more receive beams include multiple receive beams corresponding to the multiple SROs.

In a seventeenth aspect, alone or in combination with one or more of the first through sixteenth aspects, based at least in part on the one or more selected SROs including a single SRO that is mapped to multiple SSBs and the one or more SRs including a single SR that is transmitted on the single SRO, the one or more receive beams include multiple receive beams corresponding to the multiple SSBs.

In an eighteenth aspect, alone or in combination with one or more of the first through seventeenth aspects, the control channel is received on a control channel occasion, and the control channel occasion is mapped to the one or more selected SROs.

In a nineteenth aspect, alone or in combination with one or more of the first through eighteenth aspects, based at least in part on a control channel occasion associated with the control channel not being mapped to the one or more selected SROs, the method further comprises monitoring for the control channel during a time period after transmitting the one or more SRs.

In a twentieth aspect, alone or in combination with one or more of the first through nineteenth aspects, process 800 includes transmitting another SR after the time period has elapsed based at least in part on failing to receive the control channel during the time period.

In a twenty-first aspect, alone or in combination with one or more of the first through twentieth aspects, process 800 includes monitoring a control channel occasion that is mapped to the one or more selected SROs based at least in part on the one or more SRs being transmitted on the one or more selected SROs.

In a twenty-second aspect, alone or in combination with one or more of the first through twenty-first aspects, the one or more selected SROs are mapped to one or more control channel occasions in a one-to-one relationship.

In a twenty-third aspect, alone or in combination with one or more of the first through twenty-second aspects, the one or more selected SROs include multiple SROs that are mapped to one or more control channel occasions, and a control channel occasion, of the one or more control channel occasions, is mapped to two or more SROs of the multiple SROs.

In a twenty-fourth aspect, alone or in combination with one or more of the first through twenty-third aspects, the one or more selected SROs are mapped to multiple control channel occasions, and an SRO, of the one or more selected SROs, is mapped to two or more control channel occasions of the multiple control channel occasions.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
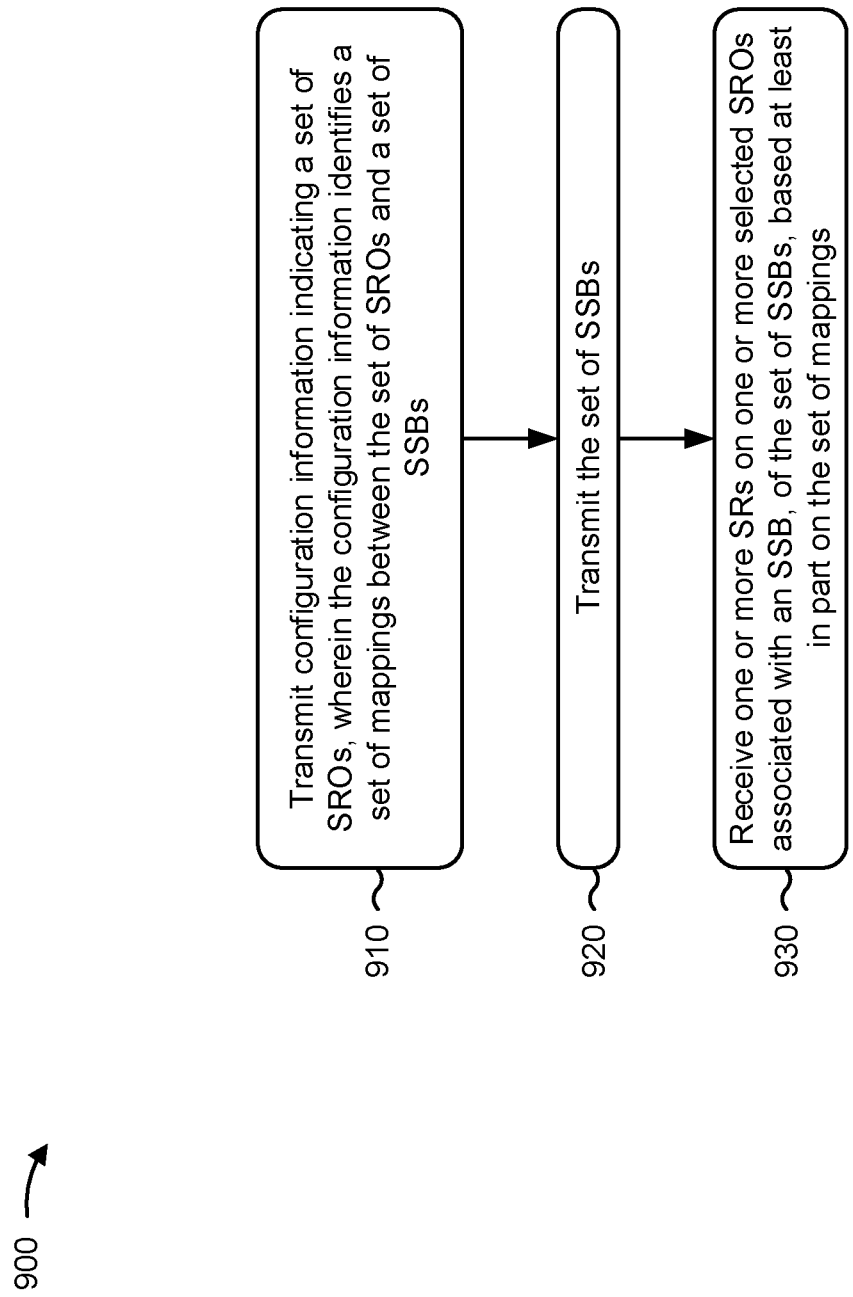
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., base station 110, the base station of FIGS. 3-7, and/or the like) performs operations associated with scheduling using SROs.

As shown in FIG. 9, in some aspects, process 900 may include transmitting configuration information indicating a set of SROs, wherein the configuration information identifies a set of mappings between the set of SROs and a set of SSBs (block 910). For example, the base station (e.g., using controller/processor 240, transmit processor 220, TX MIMO processor 230, MOD 232, antenna 234, and/or the like) may transmit configuration information indicating a set of SROs, as described above. In some aspects, the configuration information identifies a set of mappings between the set of SROs and a set of SSBs.

As further shown in FIG. 9, in some aspects, process 900 may include transmitting the set of SSBs (block 920). For example, the base station (e.g., using controller/processor 240, transmit processor 220, TX MIMO processor 230, MOD 232, antenna 234, and/or the like) may transmit the set of SSBs, as described above. The base station may transmit the set of SSBs on a respective set of beams.

As further shown in FIG. 9, in some aspects, process 900 may include receiving one or more SRs on one or more selected SROs associated with an SSB, of the set of SSBs, based at least in part on the set of mappings (block 930). For example, the base station (e.g., using antenna 234, DEMOD 232, MIMO detector 236, receive processor 238, controller/processor 240, and/or the like) may receive one or more SRs on one or more selected SROs associated with an SSB, of the set of SSBs, based at least in part on the set of mappings, as described above.

Process 900 may include additional aspects, such as any single aspect or any combination of aspects described below and/or in connection with one or more other processes described elsewhere herein.

In a first aspect, the set of SROs is UE-specific.

In a second aspect, the set of SROs is cell-specific.

In a third aspect, alone or in combination with one or more of the first and second aspects, the set of SROs comprises a set of random access channel occasions.

In a fourth aspect, alone or in combination with one or more of the first through third aspects, the set of mappings includes mappings of single SROs, of the set of SROs, to single SSBs of the set of SSBs.

In a fifth aspect, alone or in combination with one or more of the first through fourth aspects, the set of mappings includes a mapping of a single SRO, of the set of SROs, to two or more SSBs of the set of SSBs.

In a sixth aspect, alone or in combination with one or more of the first through fifth aspects, the set of mappings includes a mapping of two or more SROs, of the set of SROs, to a single SSB of the set of SSBs.

In a seventh aspect, alone or in combination with one or more of the first through sixth aspects, process 900 includes monitoring the set of SROs using respective beams corresponding to the set of SSBs, wherein the receiving is based at least in part on the monitoring.

In an eighth aspect, alone or in combination with one or more of the first through seventh aspects, the one or more selected SROs comprise one or more cell-specific SROs, and the one or more SRs are received on a UE-specific SR resource, identified by the configuration information, associated with the UE.

In a ninth aspect, alone or in combination with one or more of the first through eighth aspects, the UE-specific SR resource includes a contention-free random access channel preamble.

In a tenth aspect, alone or in combination with one or more of the first through ninth aspects, the one or more cell-specific SROs comprise one or more RACH occasions, and the UE is configured with one or more respective contention-free RACH preambles corresponding to the one or more RACH occasions.

In an eleventh aspect, alone or in combination with one or more of the first through tenth aspects, the one or more cell-specific SROs comprise multiple RACH occasions, and the UE is configured with one or more respective contention-free RACH preambles corresponding to a subset of the one or more RACH occasions.

In a twelfth aspect, alone or in combination with one or more of the first through eleventh aspects, process 900 includes transmitting, on one or more transmit beams associated with the one or more selected SROs, at least one of a control channel or a downlink transmission associated with the control channel.

In a thirteenth aspect, alone or in combination with one or more of the first through twelfth aspects, based at least in part on the one or more selected SROs being mapped to a single SSB and the one or more SRs being received using a single SRO, the one or more transmit beams include a single transmit beam.

In a fourteenth aspect, alone or in combination with one or more of the first through thirteenth aspects, based at least in part on the one or more selected SROs being mapped to a single SSB and the one or more SRs including multiple SRs that are transmitted on multiple SROs, the one or more transmit beams include multiple transmit beams corresponding to the multiple SROs.

In a fifteenth aspect, alone or in combination with one or more of the first through fourteenth aspects, based at least in part on the one or more selected SROs including a single SRO that is mapped to multiple SSBs and the one or more SRs including a single SR that is received on the single SRO, the one or more transmit beams include multiple transmit beams corresponding to the multiple SSBs.

In a sixteenth aspect, alone or in combination with one or more of the first through fifteenth aspects, the control channel is transmitted on a control channel occasion, and the control channel occasion is mapped to the one or more selected SROs.

In a seventeenth aspect, alone or in combination with one or more of the first through sixteenth aspects, the one or more selected SROs are mapped to one or more control channel occasions in a one-to-one relationship.

In an eighteenth aspect, alone or in combination with one or more of the first through seventeenth aspects, the one or more selected SROs include multiple SROs that are mapped to one or more control channel occasions, and a control channel occasion, of the one or more control channel occasions, is mapped to two or more SROs of the multiple SROs.

In a nineteenth aspect, alone or in combination with one or more of the first through eighteenth aspects, the one or more selected SROs are mapped to multiple control channel occasions, and an SRO, of the one or more selected SROs, is mapped to two or more control channel occasions of the multiple control channel occasions.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: receiving configuration information indicating a set of scheduling request (SR) occasions (SROs), wherein the configuration information identifies a set of mappings between the set of SROs and a set of synchronization signal blocks (SSBs); receiving an SSB of the set of SSBs; and transmitting one or more SRs on one or more selected SROs associated with the received SSB based at least in part on the set of mappings.

Aspect 2: The method of Aspect 1, wherein the set of SROs is UE-specific.

Aspect 3: The method of Aspect 1, wherein the set of SROs is cell-specific.

Aspect 4: The method of any of Aspects 1-3, wherein the set of SROs comprises a set of random access channel occasions.

Aspect 5: The method of any of Aspects 1-4, wherein the set of mappings includes mappings of single SROs, of the set of SROs, to single SSBs of the set of SSBs.

Aspect 6: The method of any of Aspects 1-5, wherein the set of mappings includes a mapping of a single SRO, of the set of SROs, to two or more SSBs of the set of SSBs.

Aspect 7: The method of any of Aspects 1-6, wherein the set of mappings includes a mapping of two or more SROs, of the set of SROs, to a single SSB of the set of SSBs.

Aspect 8: The method of any of Aspects 1-7, further comprising: selecting the one or more selected SROs associated with the received SSB based at least in part on receiving the SSB, wherein transmitting the one or more SRs on the one or more selected SROs is based at least in part on selecting the one or more selected SROs.

Aspect 9: The method of Aspect 8, wherein the SSB is associated with a best measurement of a received set of SSBs that are received by the UE.

Aspect 10: The method of Aspect 8, further comprising: determining a transmit beam associated with the received SSB, wherein the transmitting comprises transmitting the one or more SRs on the one or more selected SROs using the transmit beam.

Aspect 11: The method of any of Aspects 1-10, wherein the one or more selected SROs comprise one or more cell-specific SROs, and wherein the one or more SRs are transmitted on a UE-specific SR resource, identified by the configuration information, associated with the UE.

Aspect 12: The method of Aspect 11, wherein the UE-specific SR resource includes a contention-free random access channel preamble.

Aspect 13: The method of Aspect 11, wherein the one or more cell-specific SROs comprise one or more random access channel (RACH) occasions, and wherein the UE is configured with one or more respective contention-free RACH preambles corresponding to the one or more RACH occasions.

Aspect 14: The method of Aspect 11, wherein the one or more cell-specific SROs comprise multiple random access channel (RACH) occasions, and wherein the UE is configured with one or more respective contention-free RACH preambles corresponding to a subset of the one or more RACH occasions.

Aspect 15: The method of any of Aspects 1-14, further comprising: receiving, on one or more receive beams associated with the one or more selected SROs, at least one of a control channel or a downlink transmission associated with the control channel.

Aspect 16: The method of Aspect 15, wherein, based at least in part on the one or more selected SROs being mapped to a single SSB and the one or more SRs being transmitted using a single SRO, the one or more receive beams include a single receive beam.

Aspect 17: The method of Aspect 15, wherein, based at least in part on the one or more selected SROs being mapped to a single SSB and the one or more SRs including multiple SRs that are transmitted on multiple SROs, the one or more receive beams include multiple receive beams corresponding to the multiple SROs.

Aspect 18: The method of Aspect 15, wherein, based at least in part on the one or more selected SROs including a single SRO that is mapped to multiple SSBs and the one or more SRs including a single SR that is transmitted on the single SRO, the one or more receive beams include multiple receive beams corresponding to the multiple SSBs.

Aspect 19: The method of Aspect 15, wherein the control channel is received on a control channel occasion, and wherein the control channel occasion is mapped to the one or more selected SROs.

Aspect 20: The method of Aspect 15, wherein, based at least in part on a control channel occasion associated with the control channel not being mapped to the one or more selected SROs, the method further comprises: monitoring for the control channel during a time period after transmitting the one or more SRs.

Aspect 21: The method of Aspect 20, further comprising: transmitting another SR after the time period has elapsed based at least in part on failing to receive the control channel during the time period.

Aspect 22: The method of Aspect 15, further comprising: monitoring a control channel occasion that is mapped to the one or more selected SROs based at least in part on the one or more SRs being transmitted on the one or more selected SROs.

Aspect 23: The method of Aspect 15, wherein the one or more selected SROs are mapped to one or more control channel occasions in a one-to-one relationship.

Aspect 24: The method of Aspect 15, wherein the one or more selected SROs include multiple SROs that are mapped to one or more control channel occasions, and wherein a control channel occasion, of the one or more control channel occasions, is mapped to two or more SROs of the multiple SROs.

Aspect 25: The method of Aspect 15, wherein the one or more selected SROs are mapped to multiple control channel occasions, and wherein an SRO, of the one or more selected SROs, is mapped to two or more control channel occasions of the multiple control channel occasions.

Aspect 26: A method of wireless communication performed by a base station, comprising: transmitting configuration information indicating a set of scheduling request (SR) occasions (SROs), wherein the configuration information identifies a set of mappings between the set of SROs and a set of synchronization signal blocks (SSBs); transmitting the set of SSBs; and receiving one or more SRs on one or more selected SROs associated with an SSB, of the set of SSBs, based at least in part on the set of mappings.

Aspect 27: The method of Aspect 26, wherein the set of SROs is UE-specific.

Aspect 28: The method of Aspect 26, wherein the set of SROs is cell-specific.

Aspect 29: The method of any of Aspects 26-28, wherein the set of SROs comprises a set of random access channel occasions.

Aspect 30: The method of any of Aspects 26-29, further comprising: transmitting, on one or more transmit beams associated with the one or more selected SROs, at least one of a control channel or a downlink transmission associated with the control channel.

Aspect 31: An apparatus for wireless communication at a device, comprising a processor; memory coupled with the processor; and instructions stored in the memory and executable by the processor to cause the apparatus to perform the method of one or more Aspects of Aspects 1-30.

Aspect 32: A device for wireless communication, comprising a memory and one or more processors coupled to the memory, the memory and the one or more processors configured to perform the method of one or more Aspects of Aspects 1-30.

Aspect 33: An apparatus for wireless communication, comprising at least one means for performing the method of one or more Aspects of Aspects 1-30.

Aspect 34: A non-transitory computer-readable medium storing code for wireless communication, the code comprising instructions executable by a processor to perform the method of one or more Aspects of Aspects 1-30.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 1-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving configuration information indicating a set of scheduling request (SR) occasions (SROs), wherein the configuration information identifies a set of mappings between the set of SROs and a set of synchronization signal blocks (SSBs);
   receiving an SSB of the set of SSBs; and
   transmitting one or more SRs on one or more selected SROs associated with the received SSB based at least in part on the set of mappings, wherein the one or more selected SROs are mapped to a single SSB and the one or more SRs are transmitted on multiple SROs.

2. The method of claim 1, wherein the set of SROs is UE-specific.

3. The method of claim 1, wherein the set of SROs is cell-specific.

4. The method of claim 1, wherein the set of SROs comprises a set of random access channel occasions.

5. The method of claim 1, wherein the set of mappings includes mappings of single SROs, of the set of SROs, to single SSBs of the set of SSBs.

6. The method of claim 1, wherein the set of mappings includes a mapping of a single SRO, of the set of SROs, to two or more SSBs of the set of SSBs.

7. The method of claim 1, wherein the set of mappings includes a mapping of two or more SROs, of the set of SROs, to a single SSB of the set of SSBs.

8. The method of claim 1, further comprising:
   selecting the one or more selected SROs associated with the received SSB based at least in part on receiving the SSB, wherein transmitting the one or more SRs on the one or more selected SROs is based at least in part on selecting the one or more selected SROs.

9. The method of claim 8, wherein the SSB is associated with a best measurement of a received set of SSBs that are received by the UE.

10. The method of claim 8, further comprising:
    determining a transmit beam associated with the received SSB,
    wherein the transmitting comprises transmitting the one or more SRs on the one or more selected SROs using the transmit beam.

11. The method of claim 1, wherein the one or more selected SROs comprise one or more cell-specific SROs, and wherein the one or more SRs are transmitted on a UE-specific SR resource, identified by the configuration information, associated with the UE.

12. The method of claim 11, wherein the UE-specific SR resource includes a contention-free random access channel preamble.

13. The method of claim 11, wherein the one or more cell-specific SROs comprise one or more random access channel (RACH) occasions, and wherein the UE is configured with one or more respective contention-free RACH preambles corresponding to the one or more RACH occasions.

14. The method of claim 11, wherein the one or more cell-specific SROs comprise multiple random access channel (RACH) occasions, and wherein the UE is configured with one or more respective contention-free RACH preambles corresponding to a subset of the one or more RACH occasions.

15. The method of claim 1, further comprising:
    receiving, on one or more receive beams associated with the one or more selected SROs, at least one of a control channel or a downlink transmission associated with the control channel.

16. The method of claim 15, wherein, based at least in part on the one or more selected SROs being mapped to a single SSB and the one or more SRs being transmitted using a single SRO, the one or more receive beams include a single receive beam.

17. The method of claim 15, wherein the one or more receive beams include multiple receive beams corresponding to the multiple SROs.

18. The method of claim 15, wherein, based at least in part on the one or more selected SROs including a single SRO that is mapped to multiple SSBs and the one or more SRs including a single SR that is transmitted on the single SRO, the one or more receive beams include multiple receive beams corresponding to the multiple SSBs.

19. The method of claim 15, wherein the control channel is received on a control channel occasion of the one or more control channel occasions, and wherein the control channel occasion is mapped to the one or more selected SROs.

20. The method of claim 15, wherein, based at least in part on a control channel occasion, of the one or more control channel occasions, associated with the control channel not being mapped to the one or more selected SROs, the method further comprises:
monitoring for the control channel during a time period after transmitting the one or more SRs.

21. The method of claim 20, further comprising:
transmitting another SR after the time period has elapsed based at least in part on failing to receive the control channel during the time period.

22. The method of claim 15, further comprising:
monitoring a control channel occasion of the one or more control channel occasions that is mapped to the one or more selected SROs based at least in part on the one or more SRs being transmitted on the one or more selected SROs.

23. The method of claim 15, wherein the one or more selected SROs are mapped to the one or more control channel occasions in a one-to-one relationship.

24. The method of claim 15, wherein the one or more selected SROs include multiple SROs that are mapped to the one or more control channel occasions, and wherein a control channel occasion, of the one or more control channel occasions, is mapped to two or more SROs of the multiple SROs.

25. The method of claim 15, wherein the one or more selected SROs are mapped to multiple control channel occasions of the one or more control channel occasions, and wherein an SRO, of the one or more selected SROs, is mapped to two or more control channel occasions of the multiple control channel occasions.

26. A method of wireless communication performed by a base station, comprising:
transmitting configuration information indicating a set of scheduling request (SR) occasions (SROs), wherein the configuration information identifies a set of mappings between the set of SROs and a set of synchronization signal blocks (SSBs);
transmitting the set of SSBs; and
receiving one or more SRs on one or more selected SROs associated with an SSB, of the set of SSBs, based at least in part on the set of mappings, wherein the one or more selected SROs are mapped to a single SSB and the one or more SRs are transmitted on multiple SROs.

27. The method of claim 26, wherein the set of SROs comprises a set of random access channel occasions.

28. The method of claim 26, further comprising:
transmitting, on one or more transmit beams associated with the one or more selected SROs, at least one of a control channel or a downlink transmission associated with the control channel.

29. A user equipment (UE) for wireless communication, comprising:
a memory; and
one or more processors operatively coupled to the memory, the memory and the one or more processors configured to:
receive configuration information indicating a set of scheduling request (SR) occasions (SROs), wherein the configuration information identifies a set of mappings between the set of SROs and a set of synchronization signal blocks (SSBs);
receive an SSB of the set of SSBs; and
transmit one or more SRs on one or more selected SROs associated with the received SSB based at least in part on the set of mappings, wherein the one or more selected SROs are mapped to a single SSB and the one or more SRs are transmitted on multiple SROs.

30. A base station for wireless communication, comprising:
a memory; and
one or more processors operatively coupled to the memory, the memory and the one or more processors configured to:
transmit configuration information indicating a set of scheduling request (SR) occasions (SROs), wherein the configuration information identifies a set of mappings between the set of SROs and a set of synchronization signal blocks (SSBs);
transmit the set of SSBs; and
receive one or more SRs on one or more selected SROs associated with an SSB, of the set of SSBs, based at least in part on the set of mappings, wherein the one or more selected SROs are mapped to a single SSB and the one or more SRs are transmitted on multiple SROs.

* * * * *